May 3, 1932.  A. E. JONES  1,856,163
EYEGLASSES
Filed Feb. 23, 1927
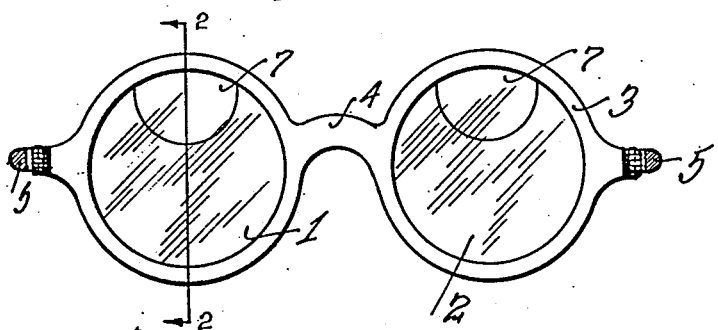
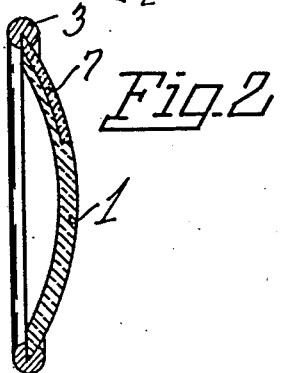
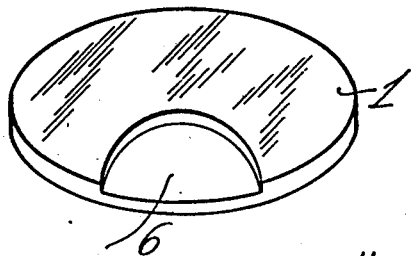
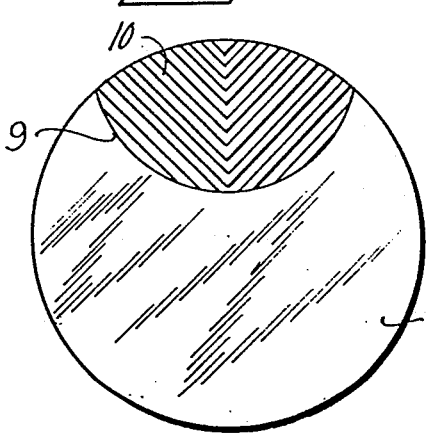
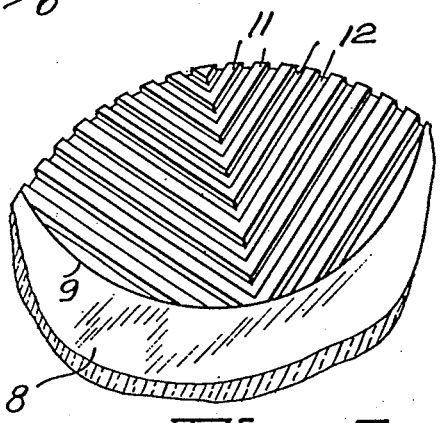
Inventor
Alfred E. Jones
By Herbert E. Smith
Attorney Patented May 3, 1932

1,856,163

UNITED STATES PATENT OFFICE

ALFRED E. JONES, OF SPOKANE, WASHINGTON

EYEGLASSES

Application filed February 23, 1927. Serial No. 170,249.

My present invention relates to improvements in eyeglasses or spectacles of the type employing in each lens different focal curvatures. By the utilization of my invention in the manufacture of lenses for eyeglasses and spectacles the lens is prepared according to a specific prescription, and a portion of the lens, which is preferably an inlaid or inset crystal, is fashioned with the different focal curvature or light refracting means. In carrying out my invention I have adapted the usual or customary eyeglasses or spectacles, prepared according to prescription for wear by a person, for use with an inset or inlaid crystal which is translucent, semi-transparent, or light refracting. This inlaid crystal may be colored glass, or it may be of clear glass with light refracting prisms on its exterior, thus rendering the glasses useful when the wearer is driving an automobile and meets an automobile with dazzling headlights, or by others that are required to look at bright or dazzling lights.

The present invention provides the usual glasses or spectacles that are in daily or constant use by the wearer, with means that permit of the shielding of the eyes by a slight downward nod or movement of the head, by which movement an approaching headlight is obscured without obscuring the roadway directly ahead of the vehicle driven by the person wearing the glasses.

The invention consists in certain novel combinations and arrangements as will hereinafter be more fully set forth. In the accompanying drawings I have illustrated several combinations and arrangements of modified means for carrying out my invention according to modes I have thus far devised for the practical application of the principles of my invention.

Figure 1 is a face view of a pair of spectacles in which the principles of my invention are embodied.

Figure 2 is a sectional view through one of the lenses at lines 2—2 of Figure 1.

Figure 3 is a perspective view of one of the lenses before the crystal is inset or inlaid therein as by fusing.

Figure 4 is a face view of a lens having a scored crystal.

Figure 5 is a perspective view, of a portion of a lens with a grooved crystal forming light refracting prisms on the exterior of the crystal that is fused in the lens.

In order that the general arrangement and relation of parts may readily be understood I have shown in Figure 1 a pair of eyeglasses or spectacles having the concavo-convex lenses 1 and 2, the frame 3 and bridge or nose bar 4 and side arms 5 of conventional form.

In carrying out my invention the lenses, prepared according to prescription, are each provided with a socket 6 of suitable shape fashioned on the exterior or convex face of the lens and opening at the edge of the lens. The socket is so positioned that the lenses are provided with the crystals 7 at the top of the vertical axes thereof when the lenses are fixed in the frame as in Figure 1.

The crystal 7, preferably of colored glass, is fashioned of the proper shape to fit into the socket 6, and when fused therein in suitable manner, the crystal forms an inset flush with and conforming to the exterior surface of the lens. When the spectacles are in proper position for use, it will be apparent that a slight nod of the head, or forward and downward movement of the head of the wearer will bring these crystals into position for the motorist to peer through at an approaching headlight, and the crystals provide a shield for obscuring the dazzling light. The remainder of the field of vision through the lenses of course permits the motorist to see the roadway directly in front of him that is illuminated by his own headlights.

In Figure 4 the socket 9 is filled with a crystal that is fused therein and provided on its exterior faces with lines or scores that form light refracting prisms 10.

In Figure 5 the lens 8 is provided with the usual socket 9 and in the latter the crystal is fused. This crystal is made light-refracting by means of prisms 11 that are formed by fashioning the exterior of the crystal with grooves 12. The grooves of Figure 5 and the scores or lines of Figure 4 are formed in two series each extending on lines at right angles or perpendicular to one another.

The grooves 12 in Figure 5 may be filled with an opaque or translucent material to exclude the light rays and render the crystal more capable of shielding the eyes.

Having thus fully described my invention what I claim as new and desire to secure by Letters Patent is—

1. Eyeglasses comprising concavo-convex lenses fashioned with sockets open at their upper edges and crystals of semitransparent quality fused in said sockets, said crystals having exterior, spaced prisms forming grooves between them.

2. Eyeglasses comprising concavo convex lenses fashioned with sockets open at the upper edges of their convex exterior faces, and crystals of semi-transparent quality fused in said sockets, said crystals having exterior prisms to form grooves therebetween and translucent material filled in said grooves.

3. Eyeglasses comprising lenses each fashioned with a socket in one of its faces, said sockets being of uniform depth throughout their extent, colored crystals of uniform thickness, having the same index of refraction as the main lenses, and having a shape corresponding to the shape of said sockets, said crystals being fitted and fused into the sockets, whereby the portions of the lenses containing the inserts will have the same focus as the clear portions.

In testimony whereof I affix my signature.

Dr. ALFRED E. JONES.